Sept. 17, 1957  W. B. RICHARDS  2,806,636
BLADED AIRLOCK STRUCTURE
Filed Dec. 14, 1953  2 Sheets-Sheet 1

INVENTOR
WILLIAM B. RICHARDS
BY Williamson, Williamson,
Schroeder & Adams
ATTORNEYS Sept. 17, 1957 W. B. RICHARDS 2,806,636
BLADED AIRLOCK STRUCTURE
Filed Dec. 14, 1953 2 Sheets-Sheet 2

INVENTOR
WILLIAM B. RICHARDS
BY Williamson, Williamson,
Schroeder & Adams
ATTORNEYS

United States Patent Office 2,806,636
Patented Sept. 17, 1957

2,806,636

BLADED AIRLOCK STRUCTURE

William B. Richards, Minneapolis, Minn., assignor to Superior Separator Company, Hopkins, Minn., a corporation of Delaware Application December 14, 1953, Serial No. 398,065

5 Claims. (Cl. 222—197)

This invention relates to rotary airlocks capable of wide usage and particularly adapted for combinative uses with other driven machinery or apparatus where an efficient seal between entrance or discharge of a machine is required and/or where measured feeding or discharge of particles is essential to the success of the machine or apparatus.

It is an object of my present invention to provide a comparatively simple but highly efficient, bladed airlock structure which will provide a very effective seal against the walls of an airlock housing and which will compensate for wear because of inherent principles of the improved construction.

A further object is the provision of a bladed airlock construction for intake or discharge of material wherein through the improved construction of the airlock rotor in combination with the discharge walls of the airlock housing, material will not adhere to the blades thereof but will be repelled and ejected from the dividing portions of the airlock through a vibratory action inherently produced.

A further object is the provision of a flexible, bladed airlock rotor wherein the blades may be individually replaced or installed with a minimum of effort and expense and with assured accurate relation with reference to the walls of the airlock housing wherein installed.

Still a further object is the provision of an efficient bladed airlock construction wherein the device cannot be jammed by the presence of large, hard particles of foreign material inadvertently admitted to the general apparatus of which my airlock is a component part.

These and other objects and advantages of my invention will more fully appear from the following description made in connection with the accompanying drawings wherein like reference characters refer to similar parts throughout the several views and in which.

Figure 6:
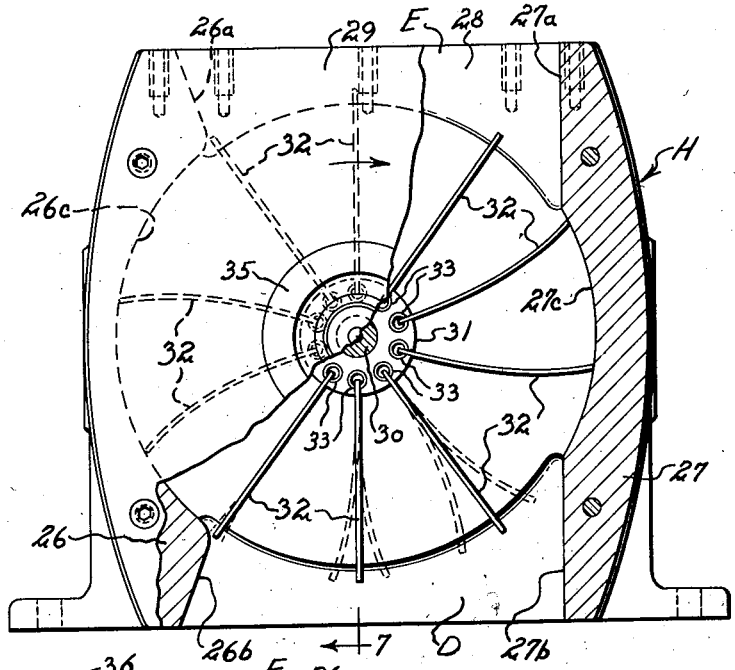
Figure 7:
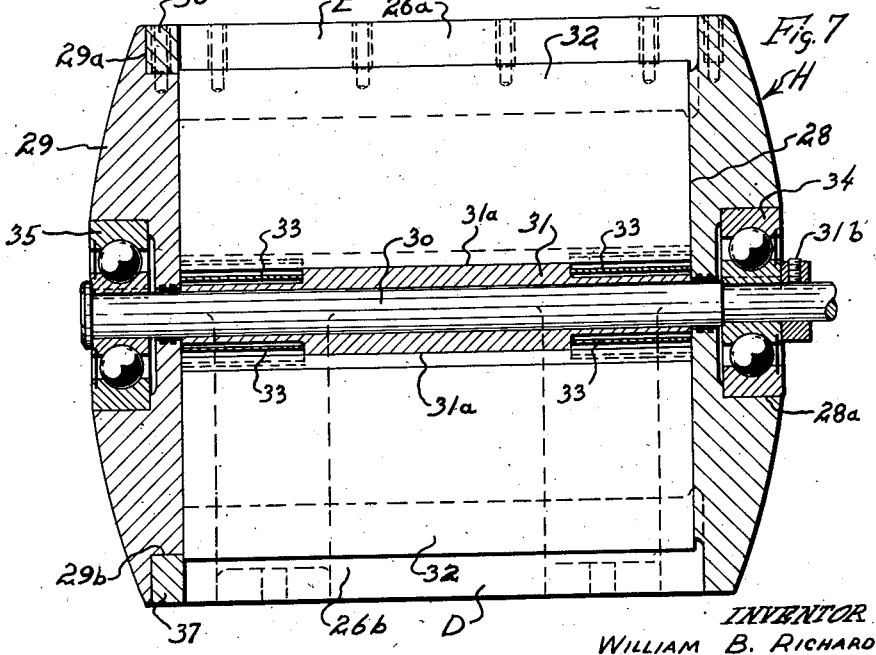

Fig. 6 is a vertical cross section showing another form of my invention applied to a downwardly directed discharge passage of a piece of apparatus wherein my mechanism is mounted for cooperative operation with the rotor disposed on a horizontal axis traversing and disposed perpendicularly to the general flow of material therethrough; and Fig. 7 is a vertical section taken on the line 7—7 of Fig. 6.

Referring now to the form of the invention illustrated in Figs. 1 to 5 of the drawings, my airlock structure is affixed to and communicates with the lower portion of a cylindrical housing or enclosure 10 (a fragment of which is shown) and which has a smooth bottom 10a supported from a suitable base 10b.

Figure 2:
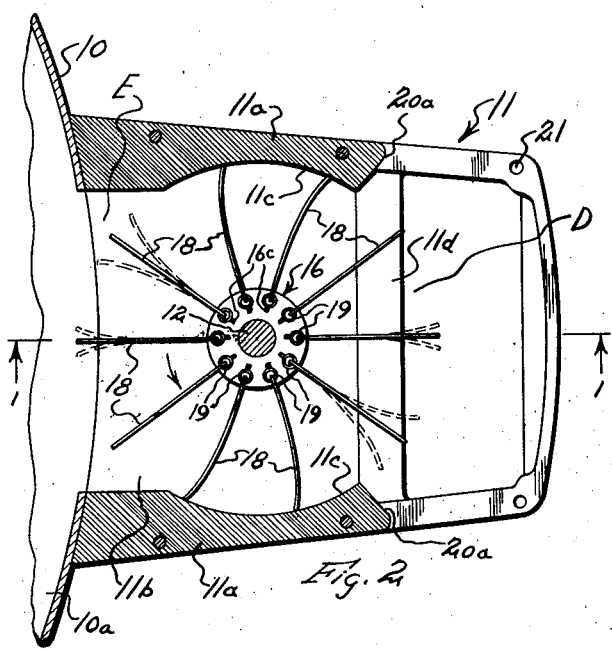
Fig. 2 is a cross section taken on the line 2—2 of Fig. 1 showing the cooperating relationship between the flexible and resilient radial blades of my rotor and the discharge defining walls of the rotor housing.

My airlock includes an upright housing indicated as an entirety by the numeral 11, having an open back defined by side walls 11a and a bottom 11b, the rear edges of said side walls being appropriately shaped to tightly fit and seal against the cylindrical walls of the machine housing 10 as shown in Fig. 2. The side walls 11a of the housing 11 have symmetrically arranged, partially cylindrical or arcuate interior surfaces 11c (see Fig. 2) which extend concentrically of a common vertical axis, to wit, the axis of the vertical rotor shaft 12. Rotor shaft 12 is suitably journaled at its upper end in a bearing assembly 13 mounted in a fixed top member 14 for the rotor housing and is journaled near its lower end in a bearing assembly 15 mounted in the horizontal bottom 11b of the housing. A bearing cover 13a is either detachably or permanently affixed to the upper end of rotor shaft 12 and has an annularly grooved under portion fitting and covering the races of the bearing assembly 13.

The outer portion of the airlock housing 11 beyond the forward ends of the side walls 11a forms a discharge chamber D which extends generally vertically and for some distance below the bottom of the airlock rotor tapering internally to form a discharge spout 11d which as shown, is provided with a depending, annular flange 11e for connection when desirable, with a duct or tube.

Fixedly but removably mounted upon the rotor shaft 12 is a rotor hub 16 of tubular form, said hub extending substantially the full height of the airlock housing between bottom wall 11b and the top wall 14 and, of course, with working clearance at the extremities of the hub with reference to the adjacent horizontal walls. Hub 16 affixed to shaft 12 as by a pair of set screws 17 is provided with a plurality of circumferentially spaced, longitudinal, blade-receiving slots 16a extending radially of the hub and inwardly from the periphery thereof for a distance requisite to the efficient securing of the rotor blades 18. Radial slots 16a communicate with and extend beyond, at the upper and lower end portions of the hub, short cylindrical bores 16b which may be drilled in circumferentially spaced relation in the ends of the tubular hub member 16, as shown, said bores extending for a length approximating 1¼ inches in the form shown. It will be noted (see Figs. 3 and 4) that the inner ends of slots 16a leave narrow slot portions 16c beyond bore 16b for facilitating removal of the split driving sleeves later to be described.

Figure 1:
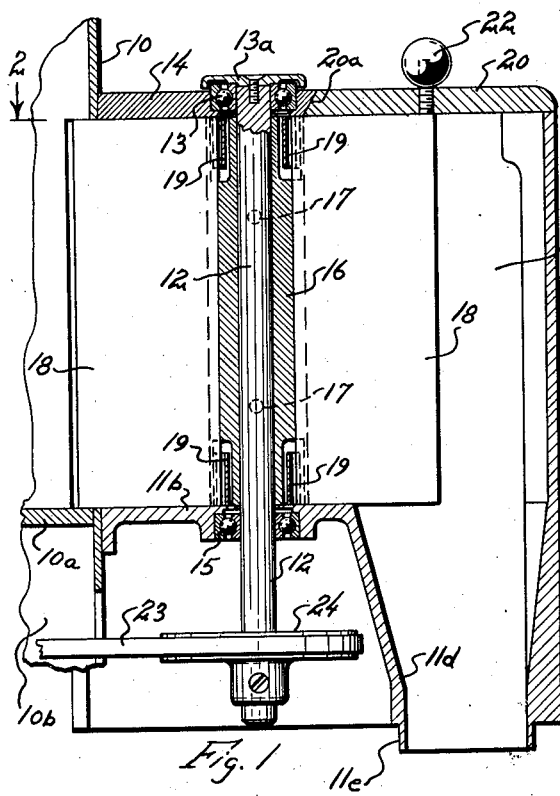
Fig. 1 is a vertical section taken axially through an embodiment of my invention constituting a part and cooperating with an apparatus such as a centrifugal dust separating machine wherein uniform conditions within the apparatus as well as in the particle discharge mechanism is required.
Figure 4:
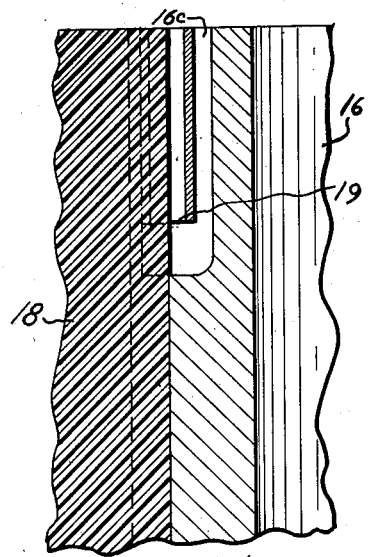
Fig. 4 is a vertical section taken on the line 4—4 of Fig. 3 illustrating the efficient and easy installation and locking of the individual rotor blades in predetermined relation with the hub.
Figure 3:
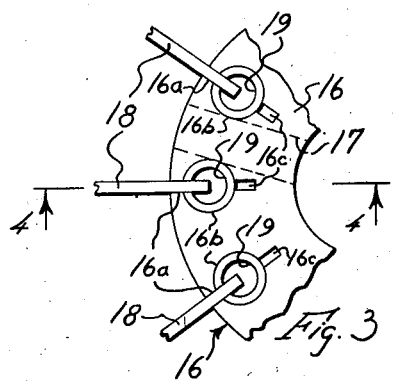
Fig. 3 is a fragmentary plan view on an enlarged scale of the rotor shown in Figs. 1 and 2 with the inspection cover of the housing removed therefrom.
Figure 5:
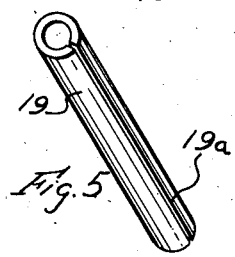
Fig. 5 is a detail perspective view showing one of the blade-locking elements detached and before expanding thereof.

The blades 18 are preferably constructed from sheets of very tough, flexible and highly resilient material such as nylon, Teflon or thin spring steel. Said blades are of rectangular configuration and preferably of uniform thickness throughout, the upper and lower portions thereof being positioned preferably flush with the upper and lower extremities of the rotor hub 16. The radial rotor blades 18 are readily assembled and fixedly secured to the hub 16 by insertion of their inner longitudinal edges into the respective radial slots 16a of the hub and thereafter by driving into the vertical bores 16b at top and bottom of the rotor hub, resilient, split driving sleeves 19 as illustrated in Figs. 3 to 5. The driving sleeves are constructed of non-corrosive spring steel or other metal and are split by a uniform longitudinal slot 19a of a width to cause a press fit with the thickness of blades 18 and of a normal diameter before expansion slightly smaller than the diameter of the bores 16b. Driving of the sleeves inwardly and longitudinally of the hub 16 with the split ends of the sleeves straddling the inner longitudinal edges of the respective blades produces vertical grooves in said edges and securely attaches the blades in operative relation to the rotor hub 16, the upper and lower edges of the respective blades and the respective driving sleeves being disposed flush with the top and bottom respectively of the hub when assembly is completed. The blades may be readily detached and replaced by first pulling the sleeves 19, initial displacement being facilitated by utilizing a prying tool with the end thereof projected downwardly and outwardly against the sleeve through the slot portions 16c which extend inwardly beyond the vertical bores 16b.

The top wall of housing 11 is completed by a removable inspection cover 20 which as shown, has a downwardly beveled rear edge 20a for engagement under a complementary bevel of the forward edge of stationary top member 14. The forward corners of the cover may be secured by suitable bolts to tapped sockets 21 formed in the forward corner edge portions of the side walls of the housing. A ball knob 22 is provided as shown, to merely facilitate lifting and removal of the inspection cover when the attachment bolts are removed.

Suitable means for driving the airlock rotor are provided, as shown, comprising an endless V-belt 23 trained about a driven pulley 24 affixed to rotor shaft 12. The V-belt is of course connected with a rotative source of power (not shown).

It is important in the proper functioning of the bladed airlock that the resilient and vibrative blades 18 be of a length greater than the space provided for them between the rotor hub and the concentric side wall portions 11c of the housing. In other words, the blades 18 are considerably longer than the radial distance between the periphery of rotor hub 16 and the partial cylindrical surfaces 11c of the housing side walls. In a unit wherein the radial distance between the hub and cylindrical surface portions 11c approximates two inches, an additional length of approximately 3/32 of an inch has been found adequate for the intended purposes but it will of course be understood that a wide variance in range is possible with production of the desired results. It will be noted from the drawings and description that the discharge area defined by the break at the outer portion of the internal cylindrical wall is unobstructed and extends for the full internal length of the housing, slightly greater than the longitudinal length of the rotor blades.

*Operation*

Material such as granular or pulverized material falls or is fed by the apparatus housed within the machine housing 10 into the relatively wide, unrestricted opening or entrance portion E of the airlock housing. It will be noted that the length of the blades 18 is preferably such that the top edges of the blades will skim material within the confines of the peripheral wall of cylindrical housing 10 of the machine. The material is thus in measured quantities positioned between the respective radial blades 18 and the pockets between the adjacent blades are continuously and rotatively advanced as shown by the direction of the arrow in Fig. 2 towards the discharge area D.

In the preferred form of my invention, the tips or leading edges of the blades do not contact with the side walls of the airlock housing until they are rotated to point of contact with the beginning of one of the concentric, partial cylindrical internal surfaces 11c of said side walls. Thus, in Fig. 2, the lower blade shown as flexed, has begun to engage the partial cylindrical surface 11c and assumes a backward curve as regards direction of rotation. A very effective sealing action is thus produced with the said resilient blade 18 being curved and under considerable tension. As the said blade leaves the outer extremity of the partial cylindrical side wall end 11c the blade snaps forwardly from its previous backwardly curved position and vibrates rapidly with a multiplicity of quick vibrations indicated by the dotted lines in the two blades which are positioned in the released discharge stages. This rapid vibration of the blades shakes off and frees small particles of even rather sticky materials, dropping the same into the discharge chamber of the housing. Following the cycle of operatiton after discharge of material, the blades are successively rotated into contact at their leading edges with the opposite partial cylindrical side wall surfaces 11c being again then bent or curved backward as illustrated in Fig. 2, and engaging and effecting a very excellent sealing between rotor and housing. Thereafter, the blades are successively brought to a position of disengagement with the side wall 11a, the high resiliency thereof again causing rapid and frequent vibrations of the blades, as indicated by the dotted lines in the entrance portion of the housing.

The flexing and attendant vibratory action of the blades at two points during a complete rotation of the rotor flakes and shakes off any material which would normally tend to adhere and which otherwise might cause eventual plugging of the airlock.

The relationship of the thin sheet blades of high flexibility and resiliency further permts a relatively large, hard particle or object to pass through the airlock because the blades will give or bend to such an extent that a hard particle of an average diameter equal to at least 1/3 the average width of the housing 11, may pass through the airlock structure. Thus, stalling or jamming of the airlock under practically all operating conditions is substantially prevented.

The excessive length of the blades 18 of course make the blades self-compensating for wear. The materials preferably selected for these blades are highly resistant to wear but with the excessive lengths and tension on the blades, a very efficient sealing or wiping action under tension is obtained throughout very long, continued usage.

In Figs. 6 and 7 a somewhat different form of the invention is illustrated wherein my airlock unit is adapted for installation and connection with a discharge duct or passage for various types of machinery and wherein the airlock rotor revolves upon a horizontal axis.

In this form, an upstanding airlock housing indicated as an entirety by the letter H is provided having opposed, spaced side walls 26 and 27 respectively, side wall 26 having a divergent upper or entrance portion 26a and a convergent discharge portion or end 26b, the intermediate portion 26c of said wall 26 being of substantial area and of partial cylindrical form and in concentric relation with the axis of the rotor shaft 30. The sidewall 27 (see Fig. 6) has vertical upper and lower entrance and discharges surfaces 27a and 27b respectively and the intermediate portion 27c of the interior of said wall is of partial cylindrical shape opposed to and concentric with rotor shaft 30 and with the cylindrical or arcuate portion 26c of the first mentioned wall. The rear end wall 28 of the rotor housing may be integrally cast with the side walls 26 and 27 and has a planar vertical interior surface which in operation of the airlock is disposed in close working clearance to one end of the rotor blades. The opposite end of rotor housing H is closed by a detachable end cap 29 which is of generally similar configuration to the end wall 28 of the housing and which is rabbeted at its upper and lower shoulders (see Fig. 7) at portions 29a and 29b respectively, to interfit with horizontal cross bars 36 and 37 rigidly secured to the appropriate end portion of the housing sides 26 and 27.

Aligned bearing assemblies 34 and 35 are mounted respectively in the fixed end 28a of the rotor housing 28 and the end cap 29 for journaling the horizontal rotor shaft 30. The axis of shaft 30 as previously stated, is concentric with the partial cylindrical surfaces 26c and 27c of the side walls of the housing H.

A rotor hub 31 identical in structure with the rotor hub of the form of the invention first described, is affixed to rotor shaft 30 by suitable means such as set screws 31b and the rotor hub is provided with a plurality of circumferentially spaced, radially extending blade-receiving slots 31a of identical construction with the slots of the rotor first described and illustrated in Figs. 1 to 5 inclusive. The blades 32 of the rotor and the longitudinally split, resilient drive sleeves or locking elements 33 are identical with the blades and locking sleeves of the form of the invention first described.

The operation of the second form of the invention is thought obvious from the foregoing description taken in connection with Figs. 6 and 7 of the drawings. The housing receives and is sealed against a piece of apparatus delivering granular or pulverized material downwardly, which material drops into the entrance portion E of the rotor housing and is guided in an efficient manner for revolution of the rotor in the direction of the arrow in Fig. 6, by the converging wall portion 26a of the housing side 26 and the vertical wall portion 27a. The inclined or converging wall area 26a prevents the pockets defined between the rotor blades from being filled prior to substantial alignment of the blade with such inclined surface thereby eliminating unnecessary friction of the materials carried. The blades 32 are longer by a requisite margin than the distance between the periphery of the rotor hub and the concentrically disposed, partial cylindrical surfaces 26c and 27c of the rotor housing. The blades as illustrated in Fig. 6 in their cycle of travel therefore are bent backwardly into tensioned wiping contact with the cylindrical portions of the housing and when successively released from such bent wiping contact at the discharge area D at the bottom of the housing, spring downwardly and vibrate rapidly to free and shake off adhering minute particles. The blades again become tensioned and assume a backward curve as regards the direction of rotation when they are brought into wiping contact at their leading edges with the cylindrical portion 26c of the housing side 26. For optimum vibratory advantages, it is important that the blades extend integrally and substantially continuously from their attachment to the hub structure to wiping contact with the housing.

From the foregoing description, it will be seen that I have invented a comparatively simple but highly efficient airlock adapted to carry out the objects herein recited.

It will of course be understood that various changes may be made in the form, details, arrangement and proportions of the parts without departing from the scope of my invention.

What I claim is:

1. A bladed airlock mechanism comprising a housing having an open material discharge area and defining a pair of opposed partially cylindrical walls disposed concentrically of a predetermined axis, a power-driven rotor mounted in said housing coaxially of said axis and having a central hub member, the periphery of said hub member being provided with a plurality of radially extending slots, said slots extending inwardly for some distance from the periphery of said hub and being circumferentially spaced and extending longitudinally of the hub, said hub having a plurality of circumferentially spaced bores formed longitudinally therethrough, said bores communicating diametrically with the inner ends of said slots, a plurality of a flexible highly resilient blade members corresponding in number to said slots and having inner edge attachment portions accommodated in such slots and extending into said bores and a plurality of longitudinally split drive-in members corresponding in number to said bores the split portions of said drive-in members accommodating and clamping against the inner attachment edges of said blades members and said blades extending at least to wipe and engage against said partial cylindrical walls.

2. The structure set forth in claim 1 further characterized by said blades being integrally constructed from sheet material of wear-resisting, flexible and highly resilient nature.

3. The structure set forth in claim 1 further characterized by said drive-in members being of split sleeve form constructed of resilient material, and when untensioned being of slightly lesser diameter than the diameter of said bores and further characterized by said radial slots extending inwardly slightly beyond split bores to provide small recesses inwardly of the ends of said bores to facilitate pull-out removal of said drive-in members.

4. A bladed airlock mechanism or the like comprising a housing having an open material discharge area and defining a pair of opposed partially cylindrical walls disposed substantially concentrically of a predetermined axis, a power-driven rotor mounted in said housing coaxially of said axis and having a central hub member, the periphery of said hub member being provided with a plurality of radially extending slots, said slots being circumferentially spaced and extending longitudinally of the hub, said hub having a plurality of circumferentially spaced bores formed longitudinally therethrough said bores communicating with the inner ends of said slots, a plurality of highly flexible resilient blade members corresponding in number to said slots and having inner edge attachment portions accommodated in said slots and extending into said bores, and a plurality of elongated drive-in members corresponding in number to said bores and driven into said bores to clamp against the inner attachment edges of said blade members for anchoring the same, and said blades extending at least to an extent to have wiping engagement against said partial cylindrical walls.

5. A bladed airlock device for continuously discharging particle material from a chamber, having in combination a housing provided with a broken internal wall of substantially cylindrical contour in parts, said wall being broken throughout its length to define an unobstructed, material-discharge area extending laterally of said housing, structural media positioned outwardly of the cylindrical portions of said wall and defining a discharge passage, a power-driven rotor mounted in said housing having a hub element coaxial with the cylindrical portions of said wall and having a plurality of integral, radial blades, the lengths of said blades longitudinally of said rotor being slightly less than the longitudinal length of said discharge area as well as the internal length of said housing, said hub member being provided with a plurality of radially extending slots which extend inwardly from the periphery of said hub and are circumferentially spaced and extend longitudinally of the hub, said hub having a plurality of circumferentially spaced bores formed longitudinally therethrough, said bores communicating diametrically with the inner ends of said slots, a plurality of flexible highly resilient blade members corresponding in number to said slots and having inner edge attachment portions accommodated in said slots and extending into said bores, a plurality of longitudinally extending drive-in members corresponding in number to said bores and driven into said bores and clamping against the inner attachment edges of said blade members to anchor the same, said blades dividing said housing into a plurality of segmental chambers, said discharge area being of a greater width than the distance between the tips of said blades, said blades being of a radial length greater than the distance between their points of attachment to said hub element to said cylindrical interior wall portion and thereby, at their tips making wiping contact with said cylindrical wall portion and being flexed along lines of curvature extending oppositely to the direction of revolution of said rotor during said wiping engagement, said blades constructed of flexible and highly resilient vibrative material producing rapid vibration thereof in said discharge area upon release of wiping contact of said blades with said cylindrical interior wall portion.

References Cited in the file of this patent
UNITED STATES PATENTS

| | | |
|---|---|---|
| 763,033 | Wolfe | June 21, 1904 |
| 829,204 | Hackburn et al. | Aug. 21, 1906 |
| 1,371,343 | Bow | Mar. 15, 1921 |
| 1,399,634 | Lund | Dec. 6, 1921 |
| 1,585,768 | Clayton et al. | May 25, 1926 |
| 1,639,415 | Poplawski | Aug. 16, 1927 |
| 2,539,253 | Jorgensen | Jan. 23, 1951 |
| 2,750,123 | Keiper | June 12, 1956 |
| 2,751,115 | Kindseth | June 19, 1956 |